(12) United States Patent
Huang

(10) Patent No.: US 8,661,188 B2
(45) Date of Patent: Feb. 25, 2014

(54) PARALLEL FLASH MEMORY CONTROLLER, CHIP AND CONTROL METHOD THEREOF

(75) Inventor: He Huang, Shenzhen Guangdong (CN)

(73) Assignee: Memoright Memoritech (Wuhan) Co., Ltd., Wuhan (CN)

( * ) Notice: Subject to any disclaimer, the term of this patent is extended or adjusted under 35 U.S.C. 154(b) by 926 days.

(21) Appl. No.: 12/599,497

(22) PCT Filed: May 5, 2008

(86) PCT No.: PCT/CN2008/070884
§ 371 (c)(1),
(2), (4) Date: Jun. 14, 2010

(87) PCT Pub. No.: WO2008/138249
PCT Pub. Date: Nov. 20, 2008

(65) Prior Publication Data
US 2010/0325346 A1    Dec. 23, 2010

(30) Foreign Application Priority Data
May 10, 2007    (CN) .......................... 2007 1 0074355

(51) Int. Cl.
*G06F 12/00*    (2006.01)
(52) U.S. Cl.
USPC .......................................................... 711/103
(58) Field of Classification Search
USPC .......................................................... 711/103
See application file for complete search history.

(56) References Cited

U.S. PATENT DOCUMENTS

2006/0136649 A1    6/2006    Park et al.

FOREIGN PATENT DOCUMENTS

| CN | 1466063 A | 1/2004 |
| CN | 1790308 A | 6/2006 |
| CN | 2791752 Y | 6/2006 |
| CN | 101082891 A | 12/2007 |

*Primary Examiner* — Matthew Bradley
(74) *Attorney, Agent, or Firm* — Seed IP Law Group PLLC

(57) ABSTRACT

A parallel flash memory controller, a chip, and a control method thereof are disclosed. First, an on-chip control bus sends flash memory control instructions in parallel to instruction parsing units (211) according to channels. Next, the instruction parsing units store (211) and parse the flash memory instructions corresponding to the flash memory channels, and sequentially send the flash memory control instruction to the flash memory control units (213). Then, the flash memory control units (213) send control instructions to the flash chips in the channels according to rows, and then the control instructions are processed in parallel in flash memory rows. In the present invention, the operations for each channel are performed independently in parallel, the flash memory control units (213) in the channels send the control instructions in series, and meanwhile, in each flash memory row, operations are concurrently performed in parallel. Therefore, the read/write rate of the flash memory is increased for many times, and the bottleneck in adopting flash memory chips to accomplish high-speed and large-capacity storage devices is effectively eliminated.

15 Claims, 4 Drawing Sheets

PARALLEL FLASH MEMORY CONTROLLER, CHIP AND CONTROL METHOD THEREOF

BACKGROUND OF THE INVENTION

1. Field of the Invention

The present invention relates to a parallel flash memory controller, a chip, and a control method thereof. More particularly, the present invention relates to a 2-dimensional (2D) parallel flash memory controller capable of arranging flash memories in channels and rows, flash memory chips, and a control method thereof.

2. Related Art

With the rapid development of PC technology, customers have increasingly high requirements on storage devices, not only in terms of capacity, performance, and speed, but also in power consumption, size, overall external environment and many other requirements concerning special environments. Currently, the storage devices that are most widely used can be generally classified into flash memory devices and hard disk devices according to the type of storage media. As for these two types of storage devices, the hard disk device, due to its lower price, has been more widely adopted than the flash memory device and thus occupies a larger market share. However, the hard disk device still has its own defects, which restricts its applications. For this reason, the flash memory device has gradually replaced the hard disk in some fields, due to certain advantages. The flash memory device has advantages of a fast random read/write speed, stable data resources due to its full-chip operation without mechanical control, low power consumption, high environmental adaptability by taking flash memory chips as the data storage units, and not being easily affected by temperature, air pressure, humidity, and air purity. Thus, flash memory devices have been widely applied. As for the hard disk, due to the internal mechanical structure, it has the defects of large power consumption, large size, noise production, high external environment requirements, and rather low random read/write rate. Therefore, in most applications, the hard disk fails to meet the requirements of the market, and as technology improves, this situation is getting even worse. For example, in portable notebook computers, the hard disk cannot be adapted to such computers due to its defects of large power consumption, poor shock resistance, and large size. Furthermore, in some special environments with higher requirements, the hard disk is restricted by its mechanical structure. However, in such environments, the flash memory shows superiority in performance. On the other hand, the flash memory is also limited in certain applications due to some inherent characteristics. These limitations mainly lie in the fact that the interface read/write rate of the flash memory device cannot be easily increased. As a result, the flash memory is restricted in the field of large-capacity storage devices, especially in those environments requiring a high device read/write rate. Therefore, how to increase the interface read/write rate of the flash memory device is the key point for expanding its potential applications.

Currently, the interface read/write rate of a common flash memory chip reaches up to 10 MBps or around tens of MBps on the average, but the PATA or SATA interface usually adopted by storage devices generally reaches a much higher rate, over 100 MBps on average. Therefore, the interface read/write rate of the flash memory chip is much smaller than that of the device, and the bottleneck of the storage device mainly focuses on the interface read/write rate of the flash memory chip. Therefore, how to effectively raise the interface rate between flash memory chips and its internal controller has become a critical point to the research and development of the flash memory device.

In addition, a multi-channel flash memory processor has appeared on the market. The PRC Patent Publication No. CN1790308A, entitled "Multi-channel Flash Memory Transmission Controller, Chip and Storage Device" puts forward an idea of multi-channel control. However, this patent does not achieve the true multi-channel parallel operation, because the data bandwidth is increased by multiplexing control signal lines of each channel and employing multiple independent data lines. In this way, the above design has the following disadvantages. First, due to the multiplexing of the flash memory feedback signal lines, if one of the flash memory chips fails in operation, all the other sets cannot start the next operation, thereby reducing the working efficiency of the device. Second, as the data operation must be performed on multiple channels at the same time, the circumstances where the operation data is insufficient for four channels to work concurrently may occur repeatedly, which wastes plenty of storage space and shortens the service life of the device when erasing and writing small files frequently. Therefore, though such design can improve the interface bandwidth of the flash memory chip to some extent, its working efficiency is rather low, and at the same time the data transmission rate is much lower than the PATA or SATA interface rate.

SUMMARY OF THE INVENTION

Accordingly, in order to eliminate the bottleneck of the flash memory in read/write operations, the present invention is directed to a parallel flash memory controller and a control method thereof, so as to effectively improve the read/write speed of a memory by performing 2D parallel control through parallel operations in flash memory channels and flash memory rows.

According to an embodiment of the present invention, a parallel flash memory controller is provided, which includes a transmission controller, for controlling data transmission; multiple instruction parsing units, in which each instruction parsing unit corresponds to one channel, for receiving and parsing flash memory control instructions sent to the channel in parallel, and further sending the flash memory control instructions to a corresponding flash memory control unit; and multiple flash memory control units, in which each flash memory control unit corresponds to one channel, for receiving the flash memory control instructions sent from the corresponding instruction parsing unit, and then sending the instructions to flash memory chips in the channel, so as to control the flash memory chips to execute operations in parallel according to rows, and feeding back the status of the flash memory chips to the instruction parsing unit in the channel.

Preferably, each instruction parsing unit has multiple instruction queues, and the flash memory control instructions stored in each instruction queue correspond to one flash memory row in the channel.

Preferably, each instruction parsing unit sends the flash memory control instructions independently in parallel. In addition, each instruction parsing unit sends the instruction queue of each flash memory row to the corresponding flash memory control unit according to a set row sequence and feedback information about the status of each flash memory row in the channel.

Preferably, each flash memory control unit further sends the flash memory control instructions in series to the corresponding flash memory row.

Preferably, flash memory chips in each flash memory row are divided into multiple layers, and each layer of flash memory chips in the same row executes the control instructions in series.

According to another embodiment of the present invention, a chip with functions of the above parallel flash memory controller is also provided.

According to still another embodiment of the present invention, a parallel flash memory control method is provided, which includes the following steps: Step 1: a main control unit (MCU) sends a control signal for each channel to an instruction parsing unit in the channel, and the instruction parsing unit first parses the control signal into operation control instructions of each flash memory row in the channel, and then determines a sequence for sending the control instructions of each flash memory row according to a set arbitration rule, and then sends the control instructions to each corresponding flash memory control unit; Step 2: the flash memory control units receive the flash memory control instructions sent from the instruction parsing units, and at the same time control the flash memory chips in the channel to execute the corresponding control instructions in parallel; and Step 3: the flash memory chips finish the data interaction through a data transmission controller.

Preferably, in Step 2, the flash memory control unit further sends the flash memory control instructions in series to each flash memory row.

Preferably, in Step 1, the instruction parsing unit sends the control instructions in the following manner: sending the instruction queue of each flash memory row to the corresponding flash memory control unit according to a set row sequence and feedback information about the status of the flash memory rows in the channel.

According to yet another embodiment of the present invention, a flash memory array control method is also provided. According to the method, a flash memory array is arranged by channels, rows, and layers. The flash memory chips in each channel execute instruction operations independently in parallel. The flash memory rows in each channel receive the instructions in series and execute instruction operations in parallel; and different layers of flash memory chips in the same row execute instruction operations in series.

In view of the above, the present invention provides a parallel flash memory controller, a chip, and a control method thereof, so as to achieve parallel processing in two aspects, that is, not only operations on multiple channels can be processed in parallel, but also operations for multiple rows in each channel can be processed in parallel. Each flash memory control unit sends pipeline control instructions to flash memory chips in different rows of each channel, that is, the flash memory chips in different rows of each channel can also perform operations in parallel after receiving the pipeline instructions. Therefore, the advantage of the present invention lies in that, the parsing and sending of the flash memory chip instructions cost relatively less time during the whole process, and most of the time is spent on operations such as copying and erasing data in the flash memories. The above pipeline operation enables various different flash memory chips in the channels to execute these operations simultaneously upon receiving the instructions, so that the data bus bandwidth for the flash memory chips in each channel can be effectively increased. In addition, according to the present invention, each flash memory row can be further divided into different layers, and different layers of flash memory chips in the same flash memory row are processed in series, so as to increase the storage space of the flash memories. Taking an array of 4 channels and 4 rows for an example, i.e., 16 flash memory chips, theoretically, the data transmission rate of the storage device may reach up to approximately 160 MBps. Besides, the test results show that, the data transmission rate for the read operation at the device interface reaches 110 MBps, and the write operation reaches 100 MBps. Therefore, the read/write rate of the present invention is many times higher than that of the current flash memory.

DETAILED DESCRIPTION OF THE INVENTION

The present invention will be illustrated below in detail through the specific embodiments with reference to the accompanying drawings.

Figure 1:
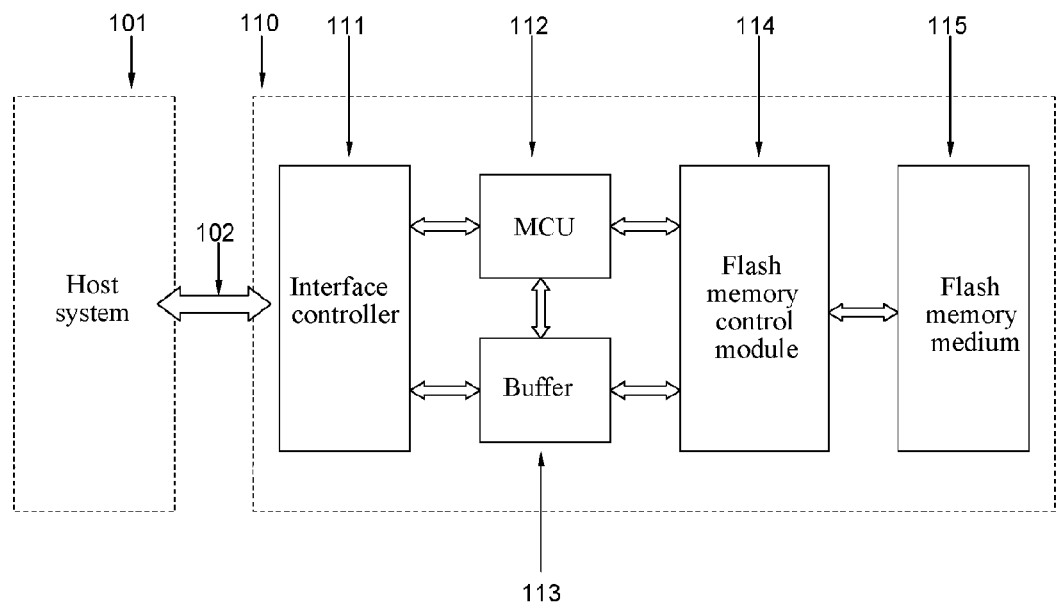
FIG. 1 is a schematic view of a basic structure for a flash memory device adopting a parallel flash memory controller of the present invention.

FIG. 1 is a schematic view of a basic structure for a flash memory device adopting a parallel flash memory controller of the present invention. In FIG. 1, the numeral 101 indicates a host system, generally a computer system. The numeral 102 indicates an interface for connecting a device to the host system 101, for example, a PATA interface in the present invention. The numeral 110 indicates the whole storage device including the device interface. The numeral 111 indicates an interface controller for completing the instructions and data interactions sent between the host and the device, for example, a PATA interface controller in the present invention, in which the interface controller is connected to a device buffer via a set of data bus, and connected to a main control unit (MCU) via a set of control signal bus. The numeral 112 indicates the MCU of the storage device, for receiving host instructions, and controlling a flash memory control module to operate according to the host instructions. The numeral 113 indicates a device buffer of the storage device, which mainly serves as a buffer for the data transmission between the host and the storage medium, and is used for storing system information of the storage device during its operation. The numeral 114 indicates a parallel flash memory controller according to an embodiment of the present invention. The numeral 115 indicates the flash memory medium, for example, flash memory chips and chip array, or a flash memory card, which serves as the information storage medium for the storage device in the present invention. In this embodiment, the flash memory medium is arranged in a 2D configuration in channels and rows.

Figure 2:
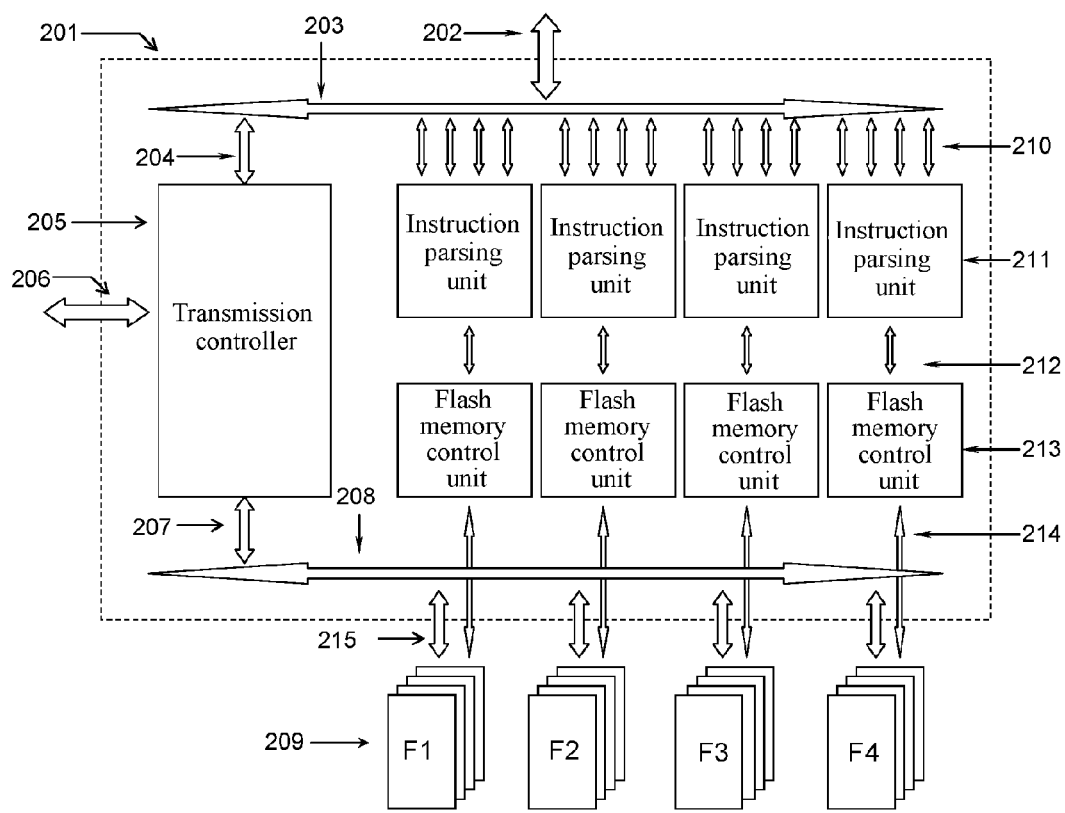
FIG. 2 is a block diagram of a parallel flash memory controller according to a preferred embodiment of the present invention.

FIG. 2 is a schematic view of an inner structure of a parallel flash memory controller chip according to the present invention. In FIG. 2, the numeral 201 indicates a parallel flash memory controller according to an embodiment of the present invention. The MCU 112 sends flash memory control instructions to a transmission controller 205 and to multiple instruction parsing units 211 through the on-chip control bus 202, 203 of the flash memory controller. The numeral 204 indicates the signal interaction between the MCU and the transmission controller 205, including control signals for the transmission controller and feedback information about the status of transmission control and error interrupts. The transmission controller 205 is mainly used for controlling data transmissions between a device buffer and a target flash memory chip. The numeral 206 indicates signal and data interactions between the transmission controller 205 and the device buffer 113, including the control of the transmission controller for the device buffer and feedback signals regarding the status of the device buffer and error interrupts, and further including data transmission between the transmission controller and the device buffer. During the read operation of the storage device, the transmission controller transmits data to an off-chip device buffer, and during the write operation of the storage device, the transmission controller first reads data from the off-chip device buffer and then transmits the data to the flash memory medium. The multiple instruction parsing units 211 finish signal interaction with the on-chip control bus 203 through multiple sets of signal lines 210, including control signals sent from the MCU to each instruction parsing unit 211 and feedback signals from the instruction parsing unit 211 to the MCU. Each instruction parsing unit parses and arbitrates the instructions 210, and sequentially sends operation instructions for the flash memory array to the control units by rows according to the status of the storage medium fed back by the flash memory control unit 213. Meanwhile, the control units 213 also send feedback signals about the status of the flash memory array and error interrupts to the instruction parsing units. In this embodiment, the flash memory array has four channels, so four instruction queue arbitration units 211 and four control units 213 are shown in the figure. The numeral 214 indicates instruction operations generated by the instruction parsing units to the control units 213 and feedback signals about the status of the flash memory array as well as interrupts. The numeral 213 indicates the flash memory control units, which are mainly used for parsing arbitrated flash memory control instructions into flash memory chip operation signals for being sent to the corresponding flash memory chips, and at the same time are used to feed back signals about the status of the control units themselves and the flash memory array as well as interrupts to the instruction parsing units. The numeral 214 indicates control signals of the flash memory control units to the corresponding flash memory chips. The flash memory control units in each channel sequentially send instructions in series to the flash memory chips in the corresponding rows and layers, and at the same time send feedback signals about the status of the flash memory chips in the corresponding channel as well as error interrupts to the instruction queue arbitration units. The numeral 215 indicates data transmission bus for the flash memory chips in each channel, and each flash memory chip finishes data transmission with the device buffer through the data transmission bus. The numeral 209 indicates storage medium, which serves as a data storage center for the whole storage device and a control terminal of the control chip. In this embodiment, the storage medium 209 is a flash memory array.

Figure 3:
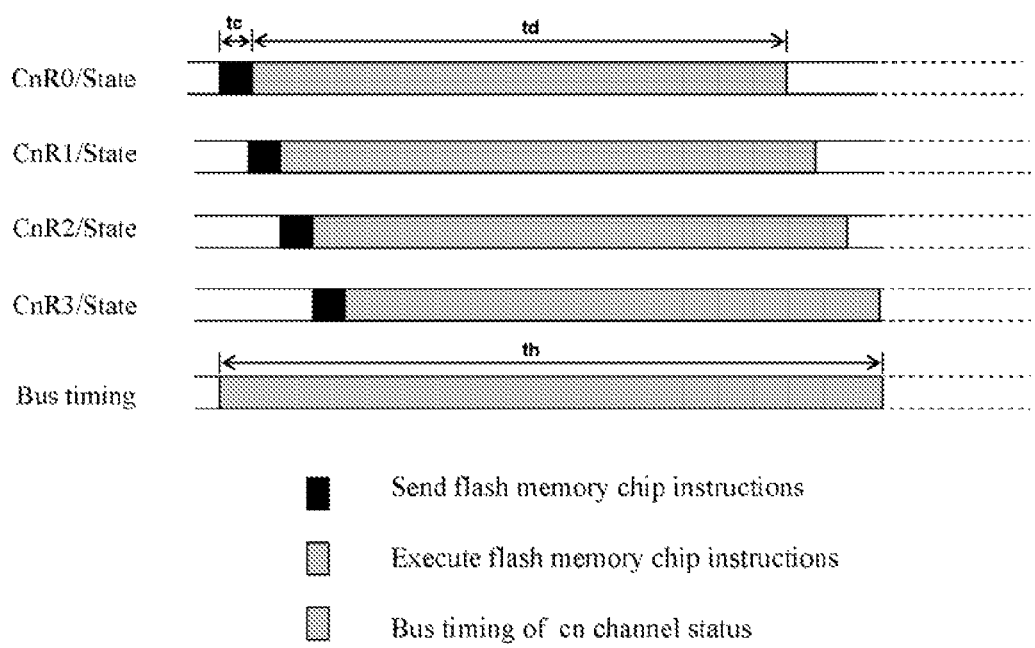
FIG. 3 is a timing chart of an erase operation for flash memory rows in flash memory channels Cn according to the present invention.

FIG. 3 is a timing chart of an erase operation for flash memory channels Cn (n=0, 1, 2, 3) according to the present invention. In FIG. 3, tc indicates the time required for the flash memory controller to send instructions to the flash memory chips, td indicates the time required for the flash memory chips to execute an erase instruction, and th indicates the time required for the bus to execute the erase operation. As seen in the figure, the instruction queues multiplex the instruction parsing units and the flash memory control units to send pipeline instructions to the flash memory chips in each channel. As for the operations of the flash memory chips, instruction interactions such as erase, write, or read instructions require relatively less time, and most of the time is spent on internal operations of the flash memory chips. Therefore, as for the MCU, four flash memory chips in the Cn channel perform the erase operation at the same time, and such pipeline operations achieve a parallel effect.

Figure 4:
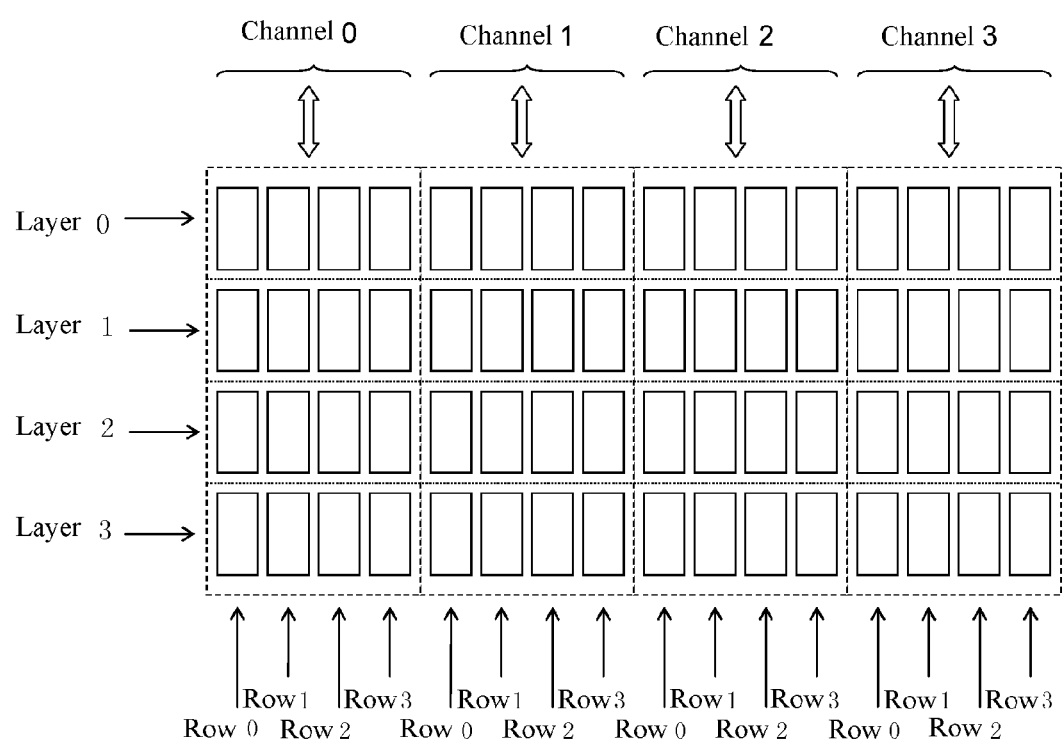
FIG. 4 is a schematic view of an array distribution of flash memory chips according to a preferred embodiment of the present invention.

The flash memory chips shown in FIG. 4 can be divided by channels, rows, and layers. In this embodiment, a flash memory chip array with 4 channels, 4 rows, and 4 layers is taken as an example below. Each flash memory control unit is used for controlling multiple flash memory chips in one flash memory channel. In particular, each flash memory control unit controls flash memory rows in the corresponding channel in parallel, and controls different layers of flash memory chips in the same flash memory row in series. That is, the flash memory chips in different rows of the same channel can be operated simultaneously at each time. A certain row in a single channel can only activate a unique corresponding layer, i.e., in each operating time period, it is impossible for different layers of flash memory chips on the same row in the same channel to be operated simultaneously. In this embodiment, upon comprehensively considering the interface read/write rate of the storage device and the interface read/write rate of the flash memory chip array, PATA widely applied in storage devices is selected as the interface, and an array of 4 channels and 4 rows, i.e., 16 flash memory chips is selected as the flash memory array. Therefore, theoretically, the data transmission rate of the storage device may reach up to approximately 160 MBps. Besides, the test results show that, the data transmission rate for the read operation at the device interface surpasses 110 MBps, and the write operation surpasses 100 MBps. Therefore, the read/write rate of the present invention is many times higher than that of the current flash memory, and the bottleneck in adopting flash memory chips to accomplish high-speed and large-capacity storage devices is effectively eliminated.

In the above embodiment, a flash memory array with 4 channels and 4 rows is taken as an example for demonstrating the present invention. Furthermore, the flash memory array of the present invention may be expanded into various flash memory array combinations with n channels and m rows, in which n is 2, 4, 8 . . . , and m is 1, 2, 4 . . . . Meanwhile, each row may be further added with several layers, so as to expand the capacity of the flash memory device. It is apparent to those skilled in the art that such variations all fall within the scope of the present invention. In addition, the 2D parallel flash memory controller provided by the present invention can be accomplished by chips such as ASIC, CPLD, or FPGA. Therefore, it will be apparent to those skilled in the art that various modifications and variations can be made to the structure of the present invention without departing from the scope or spirit of the present invention. In view of the foregoing, it is intended that the present invention cover modifications and variations of this invention provided they fall within the scope of the following claims and their equivalents.

What is claimed is:

1. A parallel flash memory controller for controlling flash memory chips in a plurality of flash memory channels, comprising:
    a transmission controller for controlling data transmission to a target flash memory chip of the flash memory chips;
    a plurality of instruction parsing units configured to
        parse, in parallel, flash memory control instructions to be sent to said channels, so as to determine a sequence for sending the flash memory control instructions according to a set of arbitration rules, a plurality of flash memory control units configured to
receive the flash memory control instructions from the instruction parsing units according to the determined sequence, send in parallel the instructions to the flash memory chips to control the flash memory chips to execute operations in parallel, and
feed back the status of the flash memory chips to the corresponding instruction parsing unit
wherein each of the instruction parsing units and its corresponding flash memory control unit are located in one channel of said channels, respectively.

2. The parallel flash memory controller as claimed in claim 1, wherein each instruction parsing unit has multiple instruction queues for the flash memory control instructions storage, and the flash memory control instructions stored in each instruction queue correspond to one flash memory row in the one channel.

3. The parallel flash memory controller as claimed in claim 2, wherein each instruction parsing unit sends the flash memory control instructions independently in parallel; and each instruction parsing unit sends the instruction queue of each flash memory row to the corresponding flash memory control units according to a set row sequence and feedback information about the status of each flash memory row in the channel.

4. The parallel flash memory controller as claimed in claim 1, wherein each flash memory control unit further sends the flash memory control instructions in series to each corresponding flash memory row.

5. The parallel flash memory controller as claimed in claim 1, wherein flash memory chips in each flash memory row are divided into multiple layers; and each layer of flash memory chips in the same row executes the control instructions in series.

6. A chip, comprising:
a parallel flash memory controller to control flash memory chips in multiple flash memory channels, the parallel flash memory controller comprising:
a transmission controller configured to control data transmission to a target flash memory chip of the flash memory chips;
a plurality of instruction parsing units,
configured to
receive and parse, in parallel, flash memory control instructions to be sent to each flash memory channel in parallel so as to determine a sequence for sending the flash memory control instructions according to a set arbitration rule;
a plurality of flash memory control units
configured to
receive the flash memory control instructions sent from the corresponding instruction parsing unit,
send, in parallel, the instructions to flash memory chips in the channel, so as to control the flash memory chips to execute operation in parallel according to rows, and feedback the status of the flash memory chips to the instruction parsing unit of the corresponding the channel; and
wherein each of the instruction parsing units and its corresponding flash memory control unit are located in one channel of said channels, respectively.

7. A parallel flash memory control method, comprising:
sending, by a main control unit (MCU), a control signal for each channel to an instruction parsing unit in the channel respectively,
parsing, by the instruction parsing unit, the control signal so to determine a sequence for sending the control instructions of each flash memory row according to a set arbitration rule, and then sending the control instructions to a corresponding flash memory control unit;
receiving, by the flash memory control units, the flash memory control instructions, and simultaneously controlling flash memory chips in the channel to execute the corresponding control instructions in parallel according to rows; and
the flash memory chips finishing data interaction through the data transmission controller.

8. The parallel flash memory control method as claimed in claim 7, the flash memory control unit further sending the flash memory control instructions in series to each flash memory row.

9. The parallel flash memory control method as claimed in claim 7, wherein the instruction parsing unit sends the control instructions in the following manner: sending an instruction queue of each flash memory row to the corresponding flash memory control unit according to a set row sequence and feedback information about the status of the flash memory rows in the channel.

10. A flash memory array control method, wherein a flash memory array is arranged by channels, rows, and layers; flash memory chips in each channel execute instruction operations independently in parallel; flash memory rows in each channel receive instructions in series and execute instruction operations in parallel; and different layers of flash memory chips in the same flash memory row execute instruction operations in series.

11. The chip as claimed in claim 6, wherein each instruction parsing unit has multiple instruction queues for the flash memory control instructions storage, and the flash memory control instructions stored in each instruction queue correspond to one flash memory row in the one channel.

12. The chip as claimed in claim 11, wherein each instruction parsing unit sends the flash memory control instructions independently in parallel; and each instruction parsing unit sends an instruction queue of each flash memory row to the corresponding flash memory control units according to a set row sequence and feedback information about the status of each flash memory row in the one channel.

13. The chip as claimed in claim 6, wherein each flash memory control unit is further configured to send the flash memory control instructions in series to each corresponding flash memory row.

14. The chip as claimed in claim 6, wherein the flash memory chips in each flash memory row are divided into multiple layers; and each layer of flash memory chips in the same row executes the control instructions in series.

15. The parallel flash memory control method as claimed in claim 8, wherein the instruction parsing unit sends the control instructions in the following manner: sending an instruction queue of each flash memory row to the corresponding flash memory control unit according to a set row sequence and feedback information about the status of the flash memory rows in the one channel.

* * * * *

UNITED STATES PATENT AND TRADEMARK OFFICE
CERTIFICATE OF CORRECTION

| | | |
|---|---|---|
| PATENT NO. | : 8,661,188 B2 | Page 1 of 1 |
| APPLICATION NO. | : 12/599497 | |
| DATED | : February 25, 2014 | |
| INVENTOR(S) | : He Huang | |

It is certified that error appears in the above-identified patent and that said Letters Patent is hereby corrected as shown below:

In the Claims

Column 7, Lines 51-52, Claim 6:
"receive the flash memory control instructions sent from the corresponding instruction parsing unit," should read, --receive the flash memory control instructions from the corresponding instruction parsing unit,--.

Signed and Sealed this
Twentieth Day of January, 2015

Michelle K. Lee
*Deputy Director of the United States Patent and Trademark Office*